(12) United States Patent  
Weinberg et al.

(10) Patent No.: US 8,187,902 B2  
(45) Date of Patent: May 29, 2012

(54) HIGH PERFORMANCE SENSORS AND METHODS FOR FORMING THE SAME

(75) Inventors: Marc S. Weinberg, Needham, MA (US); Mirela G. Bancu, Melrose, MA (US); James A. Bickford, Winchester, MA (US); Jonathan J. Bernstein, Medfield, MA (US); Richard Elliott, Stoneham, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 852 days.

(21) Appl. No.: 12/170,190

(22) Filed: Jul. 9, 2008

(65) Prior Publication Data

US 2010/0005884 A1 Jan. 14, 2010

(51) Int. Cl.
*H01L 21/00* (2006.01)
*G01P 15/125* (2006.01)
*G01C 19/56* (2012.01)

(52) U.S. Cl. ........................ 438/50; 73/504.12

(58) Field of Classification Search .................... 438/50; 73/504.12, 504.14, 514.32
See application file for complete search history.

(56) References Cited

U.S. PATENT DOCUMENTS

| | | |
|---|---|---|
| 3,053,095 A | 9/1962 | Koril et al. |
| 3,251,231 A | 5/1966 | Hunt et al. |
| 3,370,458 A | 2/1968 | Dillon |
| 3,696,429 A | 10/1972 | Tressa |
| 3,913,035 A | 10/1975 | Havens |
| 4,044,305 A | 8/1977 | Oberbeck |
| 4,122,448 A | 10/1978 | Martin |
| 4,144,764 A | 3/1979 | Hartzell, Jr. |
| 4,155,257 A | 5/1979 | Wittke |
| 4,234,666 A | 11/1980 | Gursky |
| 4,321,500 A | 3/1982 | Paros et al. |
| 4,336,718 A | 6/1982 | Washburn |
| 4,342,227 A | 8/1982 | Petersen et al. |
| 4,381,672 A | 5/1983 | O'Connor et al. |
| 4,406,992 A | 9/1983 | Kurtz et al. |
| 4,411,741 A | 10/1983 | Janata |
| 4,414,852 A | 11/1983 | McNeill |
| 4,447,753 A | 5/1984 | Ochiai et al. |
| 4,468,584 A | 8/1984 | Nakamura et al. |
| 4,478,076 A | 10/1984 | Bohrer |
| 4,478,077 A | 10/1984 | Bohrer et al. |
| 4,483,194 A | 11/1984 | Rudolf et al. |
| 4,484,382 A | 11/1984 | Kawashima et al. |
| 4,490,772 A | 12/1984 | Blickstein |
| 4,495,499 A | 1/1985 | Richardson |

(Continued)

FOREIGN PATENT DOCUMENTS

EP 0 280 905 9/1988

(Continued)

OTHER PUBLICATIONS

International Search Report and Written Opinion, PCT Application No. PCT/US2009/050045, "High Performance Sensors and Methods for Forming the Same", Oct. 27, 2009, 13 pages.

*Primary Examiner* — John Chapman, Jr.

(74) *Attorney, Agent, or Firm* — Goodwin Procter LLP

(57) ABSTRACT

A sensor includes a proof mass suspended by a suspension beam, the suspension beam having a thickness less than a thickness of the proof mass.

7 Claims, 15 Drawing Sheets

U.S. PATENT DOCUMENTS

| | | |
|---|---|---|
| 4,499,778 A | 2/1985 | Westhaver et al. |
| 4,502,042 A | 2/1985 | Wuhrl et al. |
| 4,522,072 A | 6/1985 | Sulouff et al. |
| 4,524,619 A | 6/1985 | Staudte |
| 4,538,461 A | 9/1985 | Juptner et al. |
| 4,585,083 A | 4/1986 | Nishiguchi et al. |
| 4,590,801 A | 5/1986 | Merhav et al. |
| 4,592,242 A | 6/1986 | Kempas et al. |
| 4,596,158 A | 6/1986 | Strugach |
| 4,598,585 A | 7/1986 | Boxenhorn |
| 4,600,934 A | 7/1986 | Aine et al. |
| 4,619,001 A | 10/1986 | Kane et al. |
| 4,621,925 A | 11/1986 | Masuda et al. |
| 4,628,283 A | 12/1986 | Reynolds |
| 4,629,957 A | 12/1986 | Walters et al. |
| 4,639,690 A | 1/1987 | Lewis |
| 4,644,793 A | 2/1987 | Church et al. |
| 4,651,564 A | 3/1987 | Johnson et al. |
| 4,653,326 A | 3/1987 | Danel et al. |
| 4,654,663 A | 3/1987 | Alsenz et al. |
| 4,665,605 A | 5/1987 | Kempas et al. |
| 4,670,092 A | 6/1987 | Motamedi |
| 4,671,112 A | 6/1987 | Kimura et al. |
| 4,674,180 A | 6/1987 | Zavracky et al. |
| 4,674,319 A | 6/1987 | Muller et al. |
| 4,674,331 A | 6/1987 | Watson |
| 4,679,434 A | 7/1987 | Stewart |
| 4,680,606 A | 7/1987 | Knutti et al. |
| 4,699,006 A | 10/1987 | Boxenhorn |
| 4,705,659 A | 11/1987 | Bernstein et al. |
| 4,706,374 A | 11/1987 | Murakami |
| 4,712,439 A | 12/1987 | North et al. |
| 4,727,752 A | 3/1988 | Peters |
| 4,735,506 A | 4/1988 | Pavlath |
| 4,736,629 A | 4/1988 | Cole |
| 4,743,789 A | 5/1988 | Puskas |
| 4,744,248 A | 5/1988 | Stewart |
| 4,744,249 A | 5/1988 | Stewart |
| 4,747,312 A | 5/1988 | Herzl |
| 4,750,364 A | 6/1988 | Kawamura et al. |
| 4,761,743 A | 8/1988 | Wittke |
| 4,764,244 A | 8/1988 | Chitty et al. |
| 4,776,924 A | 10/1988 | Delapierre et al. |
| 4,783,237 A | 11/1988 | Aine et al. |
| 4,789,803 A | 12/1988 | Jacobsen et al. |
| 4,792,676 A | 12/1988 | Hojo et al. |
| 4,805,456 A | 2/1989 | Howe et al. |
| 4,808,948 A | 2/1989 | Patel et al. |
| RE32,931 E | 5/1989 | Staudte |
| 4,834,538 A | 5/1989 | Heeks et al. |
| 4,851,080 A | 7/1989 | Howe et al. |
| 4,855,544 A | 8/1989 | Glenn |
| 4,869,107 A | 9/1989 | Murakami et al. |
| 4,882,933 A | 11/1989 | Petersen et al. |
| 4,884,446 A | 12/1989 | Ljung |
| 4,890,812 A | 1/1990 | Chechile et al. |
| 4,893,509 A | 1/1990 | MacIver et al. |
| 4,898,032 A | 2/1990 | Voles et al. |
| 4,899,587 A | 2/1990 | Staudte |
| 4,900,971 A | 2/1990 | Kawashima et al. |
| 4,901,586 A | 2/1990 | Blake et al. |
| 4,916,520 A | 4/1990 | Kurashima et al. |
| 4,922,756 A | 5/1990 | Henrion |
| 4,929,860 A | 5/1990 | Hulsing, II et al. |
| RE33,479 E | 12/1990 | Juptner et al. |
| 4,981,359 A | 1/1991 | Tazartes et al. |
| 5,001,383 A | 3/1991 | Kawashima et al. |
| 5,006,487 A * | 4/1991 | Stokes ............................ 438/52 |
| 5,016,072 A | 5/1991 | Greiff |
| 5,025,346 A | 6/1991 | Tang et al. |
| 5,038,613 A | 8/1991 | Takenaka et al. |
| 5,090,809 A | 2/1992 | Ferrar |
| 5,094,537 A | 3/1992 | Karpinski, Jr. |
| 5,138,883 A | 8/1992 | Paquet et al. |
| 5,203,208 A | 4/1993 | Bernstein |
| 5,205,171 A | 4/1993 | O'Brien et al. |
| 5,226,321 A | 7/1993 | Varnham et al. |
| 5,233,874 A | 8/1993 | Putty et al. |
| 5,241,861 A | 9/1993 | Hulsing, II |
| 5,349,855 A | 9/1994 | Bernstein et al. |
| 5,392,650 A | 2/1995 | O'Brien et al. |
| 5,458,000 A | 10/1995 | Burns et al. |
| 5,481,914 A | 1/1996 | Ward |
| 5,492,596 A | 2/1996 | Cho |
| 5,496,436 A | 3/1996 | Bernstein et al. |
| 5,500,549 A | 3/1996 | Takeuchi et al. |
| 5,507,911 A | 4/1996 | Greiff |
| 5,581,035 A | 12/1996 | Greiff |
| 5,635,639 A | 6/1997 | Greiff et al. |
| 5,646,348 A | 7/1997 | Greiff et al. |
| 5,659,195 A | 8/1997 | Kaiser et al. |
| 5,726,480 A | 3/1998 | Pister |
| 5,747,961 A | 5/1998 | Ward et al. |
| 5,757,103 A | 5/1998 | Lee et al. |
| 5,767,405 A | 6/1998 | Bernstein et al. |
| 5,783,973 A | 7/1998 | Weinberg et al. |
| 5,804,087 A | 9/1998 | Lee et al. |
| 5,869,760 A | 2/1999 | Geen |
| 5,892,153 A | 4/1999 | Weinberg et al. |
| 5,894,090 A | 4/1999 | Tang et al. |
| 5,894,091 A | 4/1999 | Kubota et al. |
| 5,911,156 A | 6/1999 | Ward et al. |
| 5,920,012 A | 7/1999 | Pinson |
| 5,952,574 A | 9/1999 | Weinberg et al. |
| 5,992,233 A | 11/1999 | Clark |
| 5,998,906 A | 12/1999 | Jerman et al. |
| 6,000,280 A | 12/1999 | Miller et al. |
| 6,040,625 A | 3/2000 | Ip |
| 6,064,169 A | 5/2000 | Ward et al. |
| 6,067,858 A | 5/2000 | Clark et al. |
| 6,125,700 A | 10/2000 | Tsugai et al. |
| 6,143,583 A | 11/2000 | Hays |
| 6,155,115 A | 12/2000 | Ljung |
| 6,230,566 B1 | 5/2001 | Lee et al. |
| 6,232,546 B1 | 5/2001 | DiMatteo et al. |
| 6,232,790 B1 | 5/2001 | Bryan et al. |
| 6,250,156 B1 | 6/2001 | Seshia et al. |
| 6,257,059 B1 | 7/2001 | Weinberg et al. |
| 6,263,735 B1 * | 7/2001 | Nakatani et al. ............ 73/514.36 |
| 6,277,666 B1 | 8/2001 | Hays et al. |
| 6,296,779 B1 | 10/2001 | Clark et al. |
| 6,297,069 B1 | 10/2001 | Zappella et al. |
| 6,311,556 B1 | 11/2001 | Lefort et al. |
| 6,350,983 B1 | 2/2002 | Kaldor et al. |
| 6,388,789 B1 | 5/2002 | Bernstein |
| 6,426,538 B1 | 7/2002 | Knowles |
| 6,445,195 B1 | 9/2002 | Ward |
| 6,481,285 B1 | 11/2002 | Shkel et al. |
| 6,487,864 B1 | 12/2002 | Platt et al. |
| 6,498,996 B1 | 12/2002 | Vallot |
| 6,516,666 B1 | 2/2003 | Li |
| 6,544,655 B1 | 4/2003 | Cabuz et al. |
| 6,548,321 B1 | 4/2003 | Sawyer |
| 6,550,329 B1 | 4/2003 | Watson |
| 6,571,630 B1 | 6/2003 | Weinberg et al. |
| 6,577,929 B2 | 6/2003 | Johnson et al. |
| 6,582,985 B2 | 6/2003 | Cabuz et al. |
| 6,591,678 B2 | 7/2003 | Sakai et al. |
| 6,621,279 B2 | 9/2003 | Ward |
| 6,639,289 B1 | 10/2003 | Hays |
| 6,655,190 B2 | 12/2003 | Grossman et al. |
| 6,668,111 B2 | 12/2003 | Tapalian et al. |
| 6,674,294 B2 | 1/2004 | Ward |
| 6,698,287 B2 | 3/2004 | Kubena et al. |
| 6,865,944 B2 | 3/2005 | Glenn et al. |
| 6,915,693 B2 | 7/2005 | Kim et al. |
| 6,978,673 B2 | 12/2005 | Johnson et al. |
| 7,013,730 B2 | 3/2006 | Malametz |
| 7,036,373 B2 | 5/2006 | Johnson et al. |
| 7,043,985 B2 | 5/2006 | Ayazi et al. |
| 7,051,590 B1 | 5/2006 | Lemkin et al. |
| 7,172,919 B2 | 2/2007 | Weinberg et al. |
| 7,258,010 B2 | 8/2007 | Horning et al. |
| 7,287,428 B2 | 10/2007 | Green |
| 7,300,814 B2 | 11/2007 | Cunningham et al. |
| 7,350,415 B2 | 4/2008 | LaFond |
| 2001/0001928 A1 | 5/2001 | Kikuchi et al. |

| | | |
|---|---|---|
| 2001/0042404 A1 | 11/2001 | Yazdi et al. |
| 2002/0008121 A1 | 1/2002 | Doelle |
| 2002/0023424 A1 | 2/2002 | Takamatsu et al. |
| 2002/0066317 A1 | 6/2002 | Lin |
| 2002/0081765 A1 | 6/2002 | Cabuz et al. |
| 2002/0093067 A1 | 7/2002 | Knowles |
| 2002/0167248 A1 | 11/2002 | Chua et al. |
| 2002/0171901 A1 | 11/2002 | Bernstein |
| 2002/0178817 A1 | 12/2002 | Selvakumar et al. |
| 2002/0184949 A1 | 12/2002 | Gianchandani et al. |
| 2002/0190607 A1 | 12/2002 | Paden et al. |
| 2003/0034870 A1 | 2/2003 | Becka et al. |
| 2003/0036214 A1 | 2/2003 | Eskridge |
| 2003/0077876 A1 | 4/2003 | Sawyer |
| 2003/0080648 A1 | 5/2003 | Jerman et al. |
| 2003/0106372 A1 | 6/2003 | Adams et al. |
| 2003/0107317 A1 | 6/2003 | Touchberry et al. |
| 2003/0160021 A1 | 8/2003 | Platt et al. |
| 2003/0164042 A1 | 9/2003 | Valentin |
| 2003/0167842 A1 | 9/2003 | Platt |
| 2003/0183006 A1 | 10/2003 | Platt et al. |
| 2003/0196491 A1 | 10/2003 | Platt |
| 2003/0200785 A1 | 10/2003 | Platt |
| 2003/0200803 A1 | 10/2003 | Platt |
| 2004/0035206 A1 | 2/2004 | Ward et al. |
| 2004/0132227 A1 | 7/2004 | Horning et al. |
| 2004/0180464 A1 | 9/2004 | Horning et al. |
| 2006/0201249 A1* | 9/2006 | Horning et al. ............ 73/504.14 |
| 2006/0283245 A1 | 12/2006 | Konno et al. |
| 2006/0283246 A1 | 12/2006 | Weinberg et al. |
| 2007/0026614 A1 | 2/2007 | Choo et al. |
| 2007/0029629 A1 | 2/2007 | Yazdi |
| 2007/0214891 A1 | 9/2007 | Robert et al. |
| 2007/0222011 A1 | 9/2007 | Robert et al. |
| 2007/0266787 A1 | 11/2007 | LaFond et al. |

FOREIGN PATENT DOCUMENTS

| | | |
|---|---|---|
| EP | 0 664 438 | 7/1998 |
| EP | 1 411 024 | 4/2004 |
| EP | 1752734 A2 | 2/2007 |
| EP | 1835294 A1 | 9/2007 |
| EP | 1840582 A1 | 10/2007 |
| GB | 2 183 040 | 5/1987 |
| WO | WO-96-37784 | 11/1996 |
| WO | WO-00-57194 | 9/2000 |
| WO | WO-01-22094 | 3/2001 |
| WO | WO-2005-028359 | 5/2005 |

* cited by examiner

HIGH PERFORMANCE SENSORS AND METHODS FOR FORMING THE SAME

FIELD OF THE INVENTION

The present invention relates, in various embodiments, to the fabrication of high-performance microelectromechanical systems sensors.

BACKGROUND

The advent of microelectromechanical systems (MEMS) processing techniques has enabled the fabrication of small, high-performance sensors such as accelerometers and gyroscopes. One particularly useful MEMS sensor is the tuning fork gyroscope, which is utilized to sense angular rate, i.e., angular velocity (and hence, angular displacement) in a variety of applications. A conventional tuning fork gyroscope includes one or two proof masses suspended above a substrate, typically suspended above the substrate by suspension beams that allow the proof masses to vibrate freely. The edges of the proof masses include electrode fingers, or "combs." Between and to either side of the proof masses is drive circuitry with complementary sets of combs interleaved with the proof mass combs. Voltage applied between the interleaved sets of combs enables the vibration of the proof masses in the plane of the substrate surface. To facilitate fabrication of the gyroscope, i.e., a "comb drive" device, the proof masses, suspension beams, and both sets of interleaved combs typically have the same thickness (typically approximately 20 micrometers (μm), e.g., 23 μm).

When the gyroscope rotates (undergoes angular motion), sense plates below the proof masses detect differential vertical displacement thereof (e.g., by measuring capacitance between the proof masses and the sense plates). This differential vertical displacement is translated directly into a measure of angular rate by the gyroscope. However, the performance of conventional tuning fork gyroscopes for various applications is often limited. For example, the wide-bandwidth rate noise, or "angle random walk," often may be limited to values of $0.1°/h^{1/2}$ or higher. Moreover, bias error over temperature may be limited to values of 10°/h or higher for conventional tuning fork gyroscopes.

Thus, in order to service the demand for higher-performance sensors incorporating comb drives and proof masses (such as tuning fork gyroscopes), improved designs and methods for constructing such sensors are needed.

SUMMARY

In accordance with certain embodiments, a technique is provided for forming high-performance sensors that include thicker proof masses, as well as suspension beams and/or stationary combs having thicknesses less than that of the proof mass (and/or the moving combs at the periphery thereof). As a result, the sensor exhibits superior wide-bandwidth rate noise and bias error over temperature.

In one aspect, embodiments of the invention feature a sensor that includes a proof mass suspended over a substrate by a suspension beam. The thickness of the suspension beam may be less than the thickness of the proof mass, which may be between approximately 50 μm and approximately 1000 μm. In one embodiment, the thickness of the proof mass is greater than approximately 23 μm. The difference between the thickness of the suspension beam and the thickness of the proof mass may be between approximately 10 μm and approximately 50 μm, e.g., approximately 20 μm. The proof mass and the suspension beam may include or consist essentially of silicon, and the substrate may include or consist essentially of glass. The substrate may include or consist essentially of a semiconductor material, e.g., silicon, substantially coated with a dielectric material, e.g., silicon dioxide, on at least one surface thereof.

Embodiments of the invention may include one or more of the following. The sensor may include a stationary comb disposed over the substrate. The stationary comb may have stationary comb fingers interleaved with mobile comb fingers disposed on one or more edges of the proof mass. The thickness of the stationary comb fingers may be less than the thickness of the mobile comb fingers, which may be approximately equal to the thickness of the proof mass. For example, the thickness of the stationary comb fingers may be between approximately 30 μm and approximately 40 μm.

In another aspect, embodiments of the invention feature a method of fabricating a sensor. The method may include forming a first recess in a first surface of a first substrate, as well as bonding a portion of the first surface to a second substrate. A second recess may be formed in a second surface of the first substrate, thereby forming a suspension beam suspending a proof mass over the second substrate. The second recess may be disposed over the first recess. The thickness of the suspension beam may be less than the thickness of the proof mass, and the difference in thicknesses may be approximately equal to the aggregate depth of the first and second recesses. The depths of the first and second recesses may be approximately equal.

Embodiments of the invention may feature one or more of the following. The method may include forming a third recess in the first surface of the first substrate and forming a fourth recess in the second surface of the first substrate, thereby forming a stationary comb finger disposed over the second substrate. The thickness of the stationary comb finger may be less than the thickness of a mobile comb finger disposed on an edge of the proof mass. The depths of the third and fourth recesses may be approximately equal. The first and third recesses may be formed substantially simultaneously and the second and fourth recesses may be formed substantially simultaneously.

In yet another aspect, embodiments of the invention feature a method of sensing angular rate. The method may include providing a sensor including two proof masses, each (i) being suspended over a substrate by a suspension beam having a thickness less than the thickness of the proof mass it suspends and (ii) including a plurality of mobile comb fingers on at least one edge thereof. The sensor may also include a plurality of stationary comb fingers proximate the two proof masses and interleaved with the mobile comb fingers. The method may also include applying a voltage between the stationary comb fingers and the proof masses such that the proof masses vibrate approximately parallel to a surface of the substrate. The differential displacement of the two proof masses in a plane approximately perpendicular to the surface of the substrate may be detected, and an output signal generated based on the differential displacement. The signal may represent the angular rate experienced by the sensor. The thickness of the stationary comb fingers may be less than the thickness of the mobile comb fingers. The thickness of each of the two proof masses may be between approximately 50 μm and approximately 60 μm. The wide-bandwidth rate noise of the sensor may be less than approximately $0.01°/h^{1/2}$, and its bias error over temperature may be less than approximately 1°/h.

These and other objects, along with advantages and features of the invention, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1:
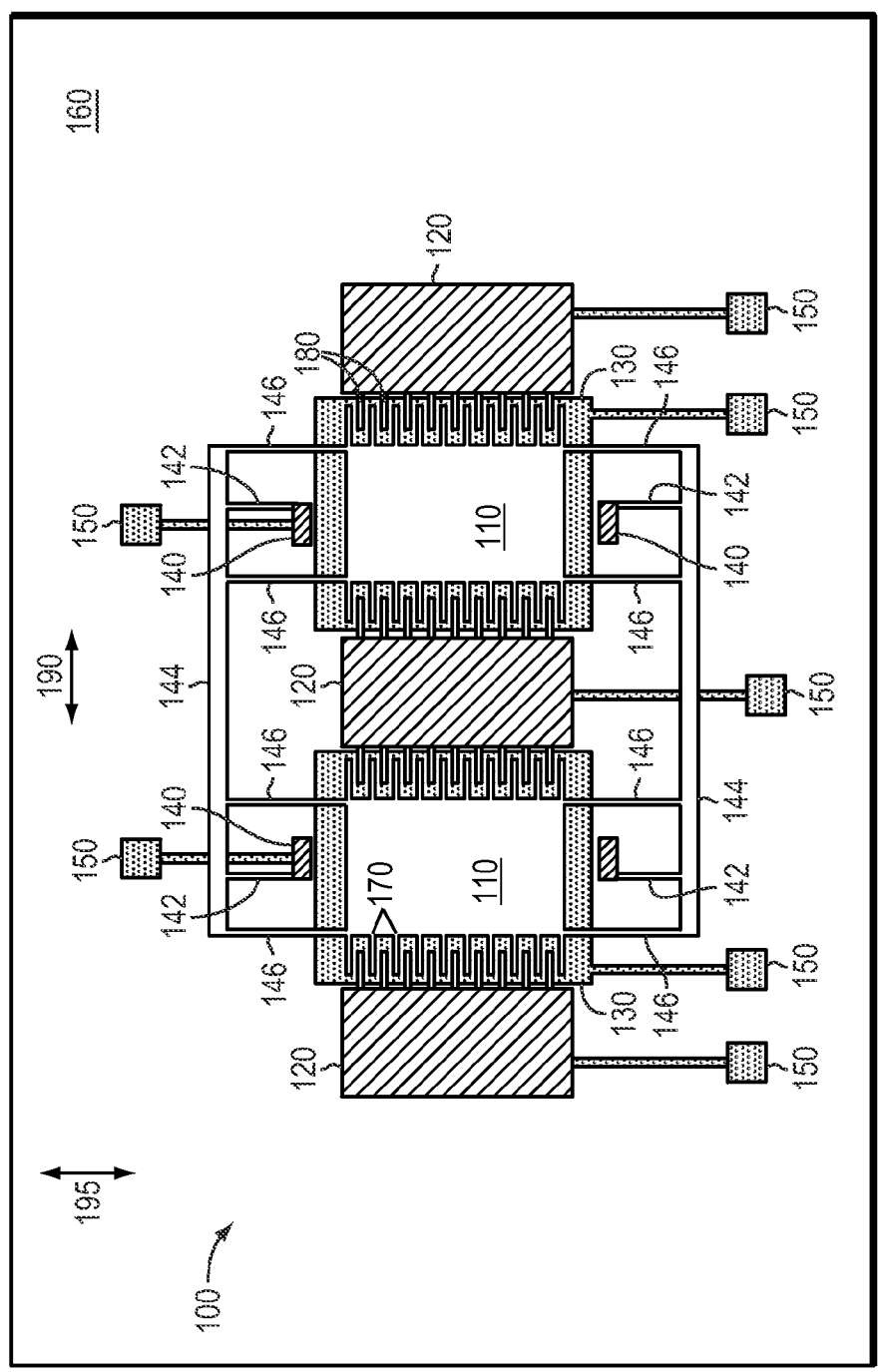
FIG. 1 is a plan view of a sensor fabricated in accordance with various embodiments of the invention.

FIG. 1 depicts an exemplary sensor 100, e.g., a tuning fork gyroscope, which includes a plurality of (e.g., two) proof masses 110, and corresponding motors 120, bottom sense plates 130, anchors 140, torsion beams 142, base beams 144, suspension beams 146, and electrical contacts 150. Sensor 100 is disposed above a substrate 160, which may include or consist essentially of glass, e.g., borosilicate glass such as PYREX (e.g., Corning 7740), available from Corning Inc. of Corning, N.Y., or BOROFLOAT, available from Schott North America, Inc. of Elmsford, N.Y. In an embodiment, substrate 160 includes or consists essentially of a semiconductor material coated with a dielectric material, e.g., an oxide such as silicon dioxide, on at least one surface. In a preferred embodiment, motors 120, bottom sense plates 130, anchors 140, and electrical contacts 150 are disposed directly in contact with substrate 160. Proof masses 110 may be suspended over substrate 160 (e.g., over recesses formed in the top surface of substrate 160) by torsion beams 142, base beams 144, and suspension beams 146, and be free to move both parallel and perpendicular to the top surface of substrate 160. In accordance with various embodiments of the invention, proof masses 110 include mobile comb fingers 170, which are preferably interleaved with stationary comb fingers 180 attached to motors 120. FIG. 1 depicts torsion beams 142 and suspension beams 146 as being completely or approximately straight, but these features may, in other embodiments, be curved, sinuous, or "folded" in a serpentine fashion.

During operation, proof masses 110 may vibrate along the axis indicated by vector 190 (approximately parallel to the top surface of substrate 160) in response to voltage applied between mobile comb fingers 170 and electrically driven stationary comb fingers 180. The distance between one or both of proof masses 110 and bottom sense plates 130 may vary in response to angular rate of sensor 100 about axis 195 due to the Coriolis effect. The differential displacement of proof masses 110 from their respective bottom sense plates 130 and/or top sense plates (not shown) may be determined by measuring the differential capacitance therebetween. Signals representing the differential displacement (and/or differential capacitance) may be communicated via electrical contacts 150 to circuitry (not shown) which may calculate the angular displacement experienced by sensor 100 and output a signal representing it. Other details of the operation of sensor 100 may be similar to those described in U.S. Pat. No. 5,349,855, the entire disclosure of which is incorporated by reference herein. Sensor 100 may also include top sense plates (not shown) disposed above proof masses 110 (e.g., with a gap therebetween), as described in U.S. Pat. No. 7,172,919, the entire disclosure of which is incorporated by reference herein. The use of both bottom and top sense plates may reduce measurement errors which may result from constant vertical acceleration.

In an embodiment of the invention, each of proof masses 110, mobile comb fingers 170, anchors 140, torsion beams 142, base beams 144, and suspension beams 146 include or consist essentially of a semiconductor material, e.g., silicon, and they all may be formed as a single continuous and seamless structure. Proof masses 110 may have thicknesses greater than the approximately 23 μm thickness of many conventional sensor proof masses. In a preferred embodiment, the thickness of proof masses 110 is between approximately 50 μm and approximately 60 μm, e.g., approximately 54 μm. In various embodiments, the thickness of proof masses 110 is between approximately 50 μm and approximately 500 μm, or even up to approximately 1000 μm. The increased thickness of proof masses 110 enables sensor 100 to exhibit wide-bandwidth rate noise values less than approximately $0.1°/h^{1/2}$, less than approximately $0.01°/h^{1/2}$, or even less than approximately $0.003°/h^{1/2}$. However, the increased thickness of proof masses 110 may result in increased bias errors that may be ameliorated as described below.

The width of suspension beams 146 may be relatively small (e.g., less than approximately 14 μm) in order to reduce thermoelastic damping in sensor 100. Such damping may cause bias error due to coupling of the drive forces and voltages of motors 120 and because proof masses 110 are typically driven at their anti-parallel resonant frequency (in phase with the proof mass velocity and the Coriolis force). Due to processing limitations, the sidewalls of suspension beams 146 may not be completely vertical, i.e., a cross-section of suspension beam 146 may have the shape of a parallelogram (or even a rhombus) rather than of a rectangle. The non-vertical slope of the sidewalls of suspension beams 146 may be less than approximately 1°. Moreover, suspension beams 146 may have a high thickness-to-width aspect ratio (e.g., greater than approximately 3:1, or even greater than approximately 4:1), which, combined with non-vertical sidewalls, may increase bias errors. These bias errors may not be significant, or even detectable, for sensors with proof masses thinner than approximately 30 μm.

The high aspect ratio and sidewall non-verticality may result in cross-coupled thermoelastic damping (or "damping cross-coupling"), an effect heretofore unknown and unconsidered in the art. Such a damping force may operate as a sense-axis force that compromises the accuracy of the output signal. Moreover, since cross-coupled damping may be proportional to temperature and in-phase with the Coriolis force detected by sensor 100, it may lead directly to temperature-sensitive bias errors. This effect may be increased dramatically as the thickness of proof masses 110 is increased from the conventional thickness of approximately 20 μm.

The sidewall non-verticality of suspension beams 146 may also result in stiffness forces being coupled into the sense direction, i.e., stiffness cross-coupling. For conventional proof mass thicknesses, stiffness cross-coupling may be reduced by trimming techniques and electronic quadrature nulling, as described in U.S. Pat. Nos. 5,481,914 and 6,571,630, the entire disclosures of which are incorporated by reference herein. However, proof mass thicknesses greater than approximately 20 μm may result in stiffness cross-coupling large enough to affect yield and/or reliability of sensor 100. Even more problematically, trimming techniques may not be able to reduce stiffness cross-coupling and damping cross-coupling simultaneously, due to their different dependencies on the aspect ratio and dimensions of suspension beams 146.

Thus, in a preferred embodiment, the thickness of suspension beams 146 is less than the thickness of proof masses 110. The thickness of suspension beams 146 may be between approximately 30 μm and approximately 40 μm. The difference in thicknesses between suspension beam 146 and proof mass 110 may be between approximately 10 μm and approximately 50 μm, e.g., approximately 20 μm. The decreased thickness of suspension beams 146 may enable a low width-to-thickness aspect ratio for suspension beams 146, e.g., an aspect ratio less than approximately 3:1 or even less than approximately 2:1. Suspension beams 146 having a smaller thickness than that of proof masses 110 enables sensor 100 to exhibit a high quality factor and/or a reduced bias error due to damping cross-coupling and stiffness cross-coupling. In various embodiments, torsion beams 142 and base beams 144 may also have thicknesses less than that of proof mass 110. The thicknesses of torsion beams 142 and base beams 144 may be substantially equal to the thickness of suspension beams 146. Reduced thickness of torsion beams 142 and base beams 144 may be particularly advantageous for designs of sensor 100 incorporating only a single proof mass 110 or multiple proof masses 110 lacking physical connections therebetween.

Temperature-sensitive bias errors may also arise from vertical misalignment between stationary comb fingers 180 and mobile comb fingers 170. Such misalignment may occur during fabrication and/or assembly of sensor 100, or even may be due to thermal stresses during operation. The bias errors may arise from drive-force cross-coupling, i.e., a deleterious lift force in the vertical direction (i.e., substantially perpendicular to axes 190,195) resulting from a vertical electric field acting on the top and/or bottom surface of mobile comb fingers 170.

Simulations were performed to estimate the magnitude of the drive-force cross-coupling for three different variants of sensor 100. In each variant, 1 V was applied to the stationary comb fingers 180 in order to drive the in-plane vibration of proof masses 110. Proof mass 110, lower sense plate 130, and upper sense plate (not shown in FIG. 1) were assumed to be grounded. A 1 μm vertical displacement of proof mass 110 was also assumed. In the first variant of sensor 100, stationary comb fingers 180 and mobile comb fingers 170 were assumed to have the same thickness (of approximately 54 μm). A net lift force (as a function of comb depth) of $-7.1 \times 10^{-14}$ N/μm results, a significant amount of force compared with the Coriolis force measured during operation of sensor 100. In the second variant, the thickness of mobile comb fingers 170 was decreased to approximately 34 μm, the mobile comb fingers 170 being "recessed" by approximately 10 μm on both top and bottom surfaces. The resulting lift force was $-8.5 \times 10^{-14}$ N/μm, a similar value to that found in the first variant. It was found that, although thinning mobile comb fingers 170 tends to decrease the lift force, it also reduces the amount of shielding between the vertical electric field and the sense plate(s) (i.e., it allows interaction therebetween, increasing the deleterious lift force). Thinning the mobile comb fingers 170 to unmanufacturable thicknesses may be required for these opposing effects to effectively reduce the overall lift force. Finally, in the third variant, stationary comb fingers 180 were reduced in thickness relative to mobile comb fingers 170, again by approximately 10 μm on both top and bottom surfaces. In this case, the lift force was decreased to $-0.18 \times 10^{-14}$ N/μm, a factor of 40 better than the prior art. Vertical electric fields at the top and bottom surfaces of stationary comb fingers 180 were closely matched and did not substantially penetrate to the sense plate(s). These results were found to be substantially linear as a function of vertical displacement, and were valid even for non-vertical comb sidewalls.

Thus, in accordance with various embodiments of the invention, the thickness of stationary comb fingers 180 may be less than the thickness of mobile comb fingers 170 and/or the thickness of proof masses 110, e.g., between approximately 30 μm and approximately 40 μm. The difference in thicknesses between stationary comb fingers 180 and mobile comb fingers 170 may be approximately 20 μm. In various embodiments, the difference in thicknesses between stationary comb fingers 180 and mobile comb fingers 170 is approximately four times the width of the gap separating each stationary comb finger 180 from each mobile comb finger 170 (which may be, e.g., approximately 5 μm). The difference in thicknesses between stationary comb fingers 180 and mobile comb fingers 170 may be approximately four times the width an individual stationary comb finger 180 or mobile comb finger 170 (which may be, e.g., approximately 5 μm). The decreased thickness of stationary comb fingers 180 may enable reduced bias errors caused by the electrostatic drive force coupling into the sense direction of sensor 100. In other embodiments, the thickness of mobile comb fingers 170 may be less than the thickness of stationary comb fingers 180, as such variants may also exhibit reduced bias errors when compared to designs of sensor 100 in which these thicknesses are equal.

In various embodiments of the invention, the thinning of suspension beams 146 and/or stationary comb fingers 180 with respect to the thickness of proof masses 110 (and/or mobile comb fingers 170) enables sensor 100 to exhibit bias error over temperature less than approximately 1°/h.

Figure 2A:
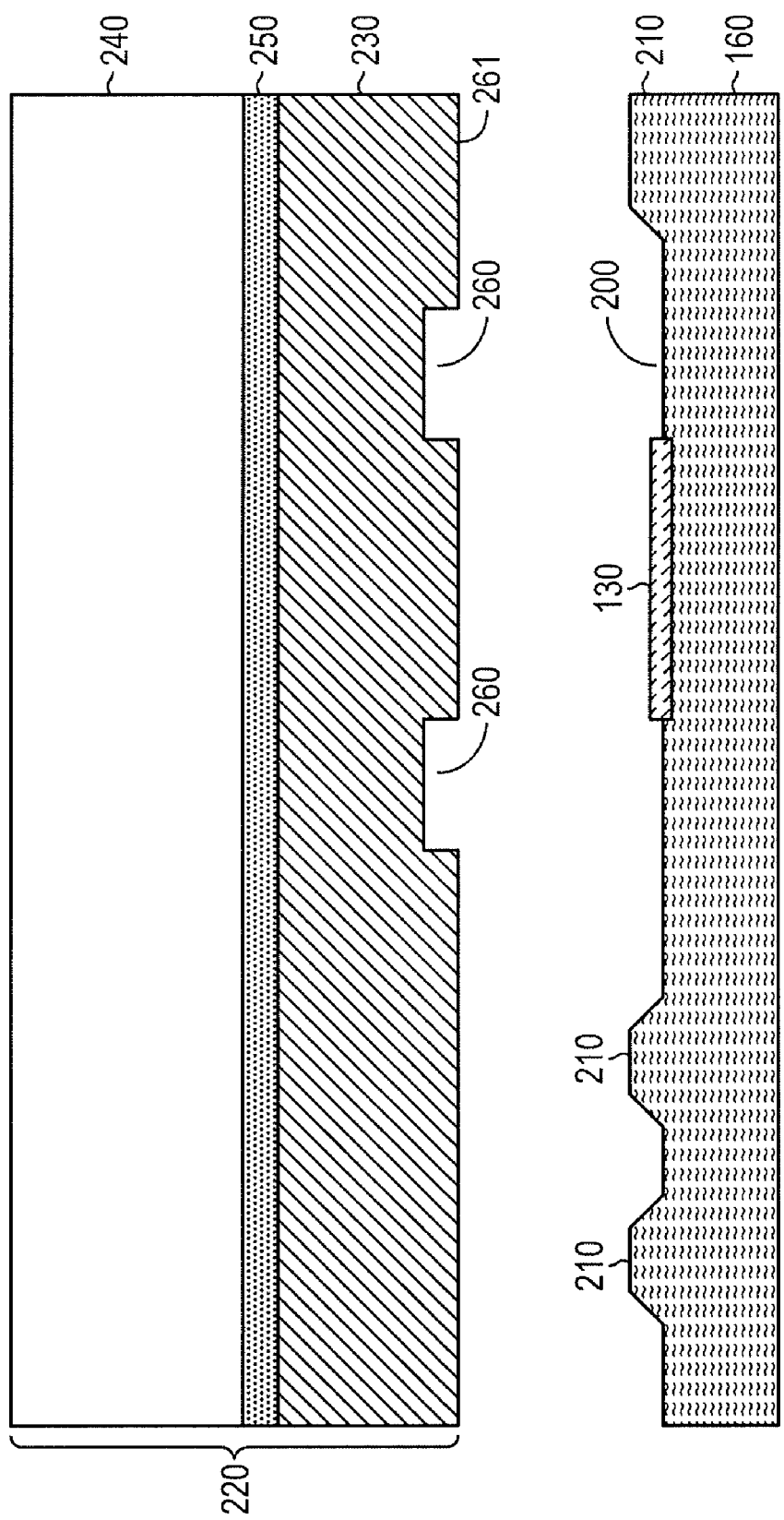
FIGS. 2A-2G are cross-sectional views of a process sequence for fabricating the sensor of FIG. 1 in accordance with an embodiment of the invention.

FIGS. 2A-2G are a series of cross-sectional views depicting an exemplary process for forming sensor 100 which includes suspension beams 146 having a thickness less than that of proof masses 110. Referring to FIG. 2A, recess 200 and mesas 210 may be formed on a surface of substrate 160, preferably simultaneously by masking off regions of substrate 160 where mesas 210 are to be formed and removing material, e.g., by wet or plasma etching, to form recess 200. Alternatively, additional material may be deposited (e.g., by chemical or physical vapor deposition) atop substrate 160 to form mesas 210, thus also forming recess 200. Bottom sense plate 130 may be formed within recess 200 by deposition (e.g., by chemical or physical vapor deposition) of a conductive material, e.g., a metal, and etching, or by a lift-off process. Mesas 210 may act as anchoring bases for various portions of sensor 100 formed directly thereon such as anchors 140 and motors 120.

A second substrate 220, from which proof masses 110, motors 120, anchors 140, torsion beams 142, base beams 144, and suspension beams 146 may be formed, is provided. Second substrate 220 may include device layer 230 disposed over handle wafer 240. In an embodiment, second substrate 220 may include or consist essentially of a semiconductor-on-insulator substrate (e.g., a silicon-on-insulator (SOI) substrate), and insulator layer 250 may be disposed between and in contact with device layer 230 and handle wafer 240. In another embodiment, device layer 230 may include or consist essentially of silicon germanium or heavily p-type-doped silicon, and insulator layer 250 may be absent from second substrate 220. Device layer 230 and/or handle wafer 240 may include or consist essentially of a semiconductor material, e.g., silicon. Insulator layer 250 may include or consist essentially of an oxide, e.g., silicon dioxide. The thickness of device layer 230 may be the approximate desired thickness of proof masses 110 in sensor 100, e.g., greater than approximately 23 μm. In an embodiment, the thickness of device layer 230 is between approximately 50 μm and approximately 1000 μm, e.g., approximately 54 μm. First recesses 260, one for each suspension beam 146 to be fabricated, may be formed in the exposed top surface 261 of device layer 230 (i.e., a first surface of second substrate 220). In an embodiment, the depth of first recesses 260 is approximately 10 μm. In an embodiment, recesses 200 may be formed in second substrate 220 rather than in substrate 160.

Figure 2B:
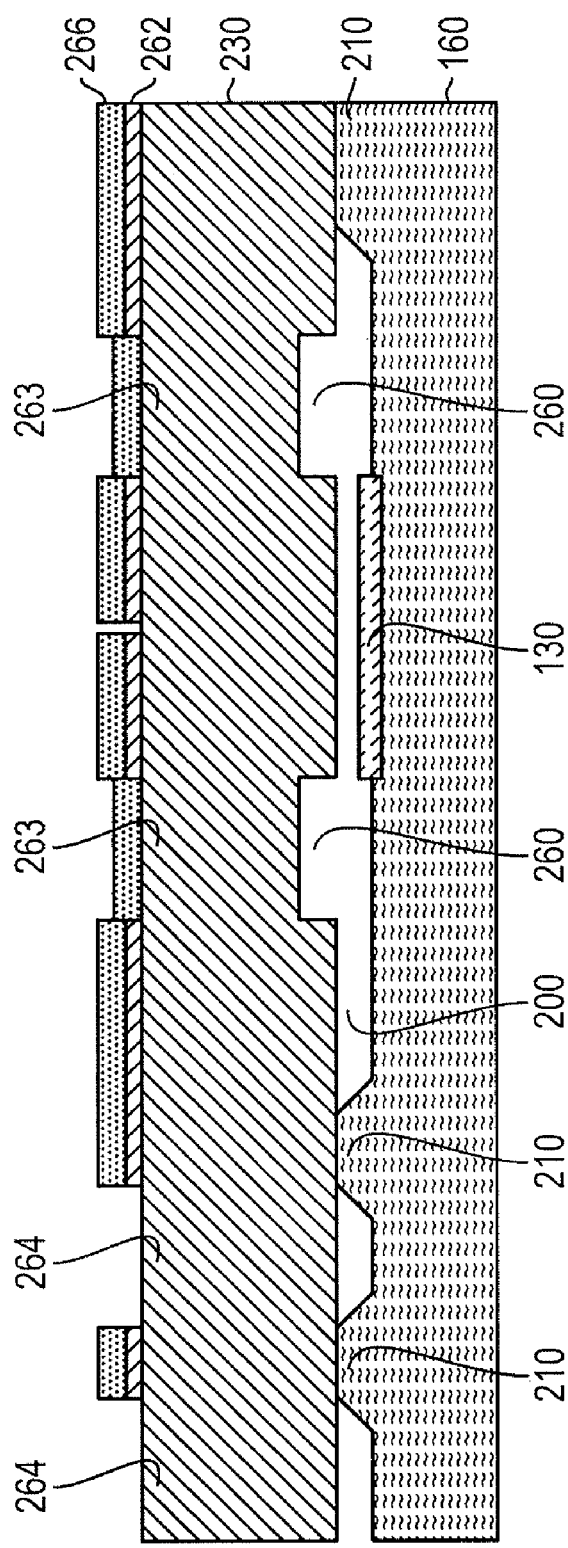

Referring to FIG. 2B, substrate 160 and second substrate 220 may be bonded together, i.e., mesas 210 on substrate 160 may be joined to the top surface of device layer 230 by, e.g., anodic bonding. After bonding, handle wafer 240 and insulator layer 250 may be removed by, e.g., two successive selective etches. For example, handle wafer 240 may be removed by exposure to an etchant such as potassium hydroxide (KOH) or ethylene diamine pyrocatechol (EDP). If present, insulator layer 250 may be removed by exposure to an etchant such as hydrofluoric acid (HF). The exposed backside of substrate 160 may be protected from the etchant by a protective layer including or consisting essentially of, e.g., metal or photoresist. After removal of handle wafer 240 and insulator layer 250, features such as proof masses 110 and motors 120 may be fabricated from device layer 230. A first mask 262 may be formed over areas of device layer 230 where thinning and/or material removal is not desired, e.g., areas defining proof masses 110. First mask 262 may include or consist essentially of a conductive material, e.g., a metal such as aluminum, or a dielectric material such as silicon dioxide. In an embodiment, first mask 262 is not formed over regions 263 of device layer 230 disposed over first recesses 260, nor over release regions 264 disposed between mesas 210 which are meant to be entirely etched away, thus releasing suspended portions of sensor 100 such as proof masses 110 (as described further below). Second mask 266 may be formed over first mask 262, as well as over regions 263. In an embodiment, second mask 266 includes or consists essentially of photoresist.

Figure 2C:
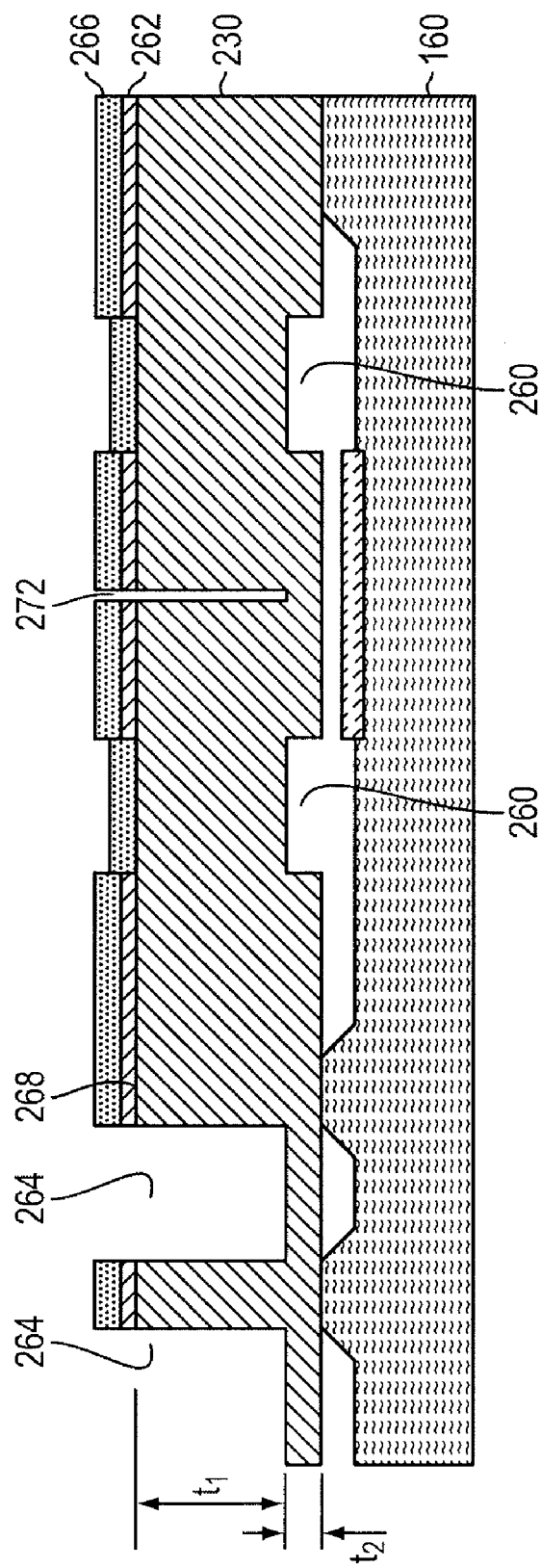

Referring to FIG. 2C, a first release etch, which removes material from release regions 264 (and not from regions protected by second mask 266), is performed on a second surface 268 of device layer 230 (i.e., a second surface of the remaining portion of second substrate 220). In an embodiment, first release etch is an inductively coupled plasma etch such as a "Bosch process" performed in an etcher available from Surface Technology Systems plc of Newport, UK. First release etch may remove a thickness $t_1$ of device layer 230 in release regions 264, which preferably leaves a thickness $t_2$ of device layer 230 in release regions 264. Thickness $t_2$ is preferably greater than zero, and may be less than or approximately equal to a depth of first recesses 260. Thus, thickness $t_1$ may be the approximate difference between the thickness of device layer 230 (which, in an embodiment, defines the thickness of proof masses 110) and the thickness of first recesses 260. In an embodiment, thickness $t_1$ is between approximately 40 μm and approximately 50 μm, e.g., approximately 44 μm. As described further below, thickness $t_2$ may define the depth of second recesses 270 (see FIG. 2E) formed on a top surface of suspension beams 146. In an embodiment, the first release etch may also remove a thickness $t_1$ of material to define one or more apertures 272 (not shown in FIG. 1 for clarity) in regions of device layer 230 where proof masses 110 are to be fabricated. As described further below, each aperture 272 may eventually define an opening through an entire thickness of a proof mass 110, as described in U.S. Pat. No. 6,257,059, the entire disclosure of which is incorporated by reference herein. Apertures 272 may reduce fluid damping in the vertical direction, reduce fluid coupling of drive motion into vertical motion, and/or allow inspection of the gap between proof mass 110 and bottom sense plate 130 during fabrication.

Figure 2D:
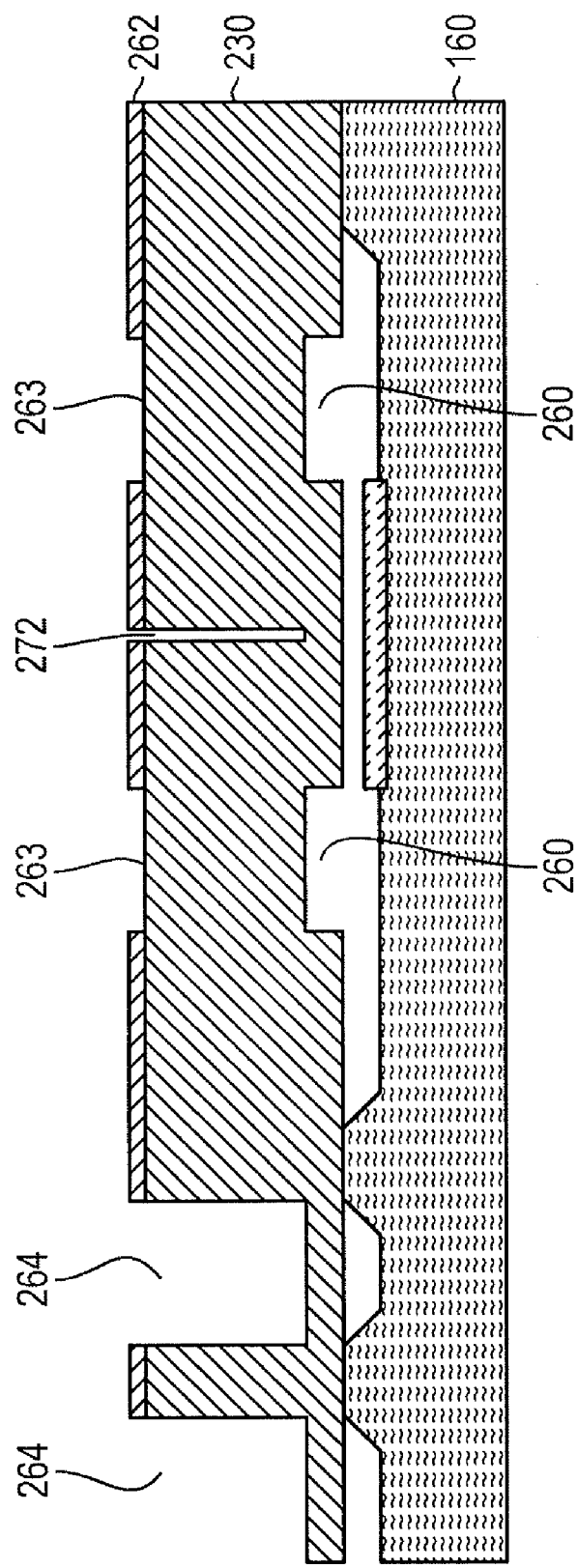
Figure 2E:
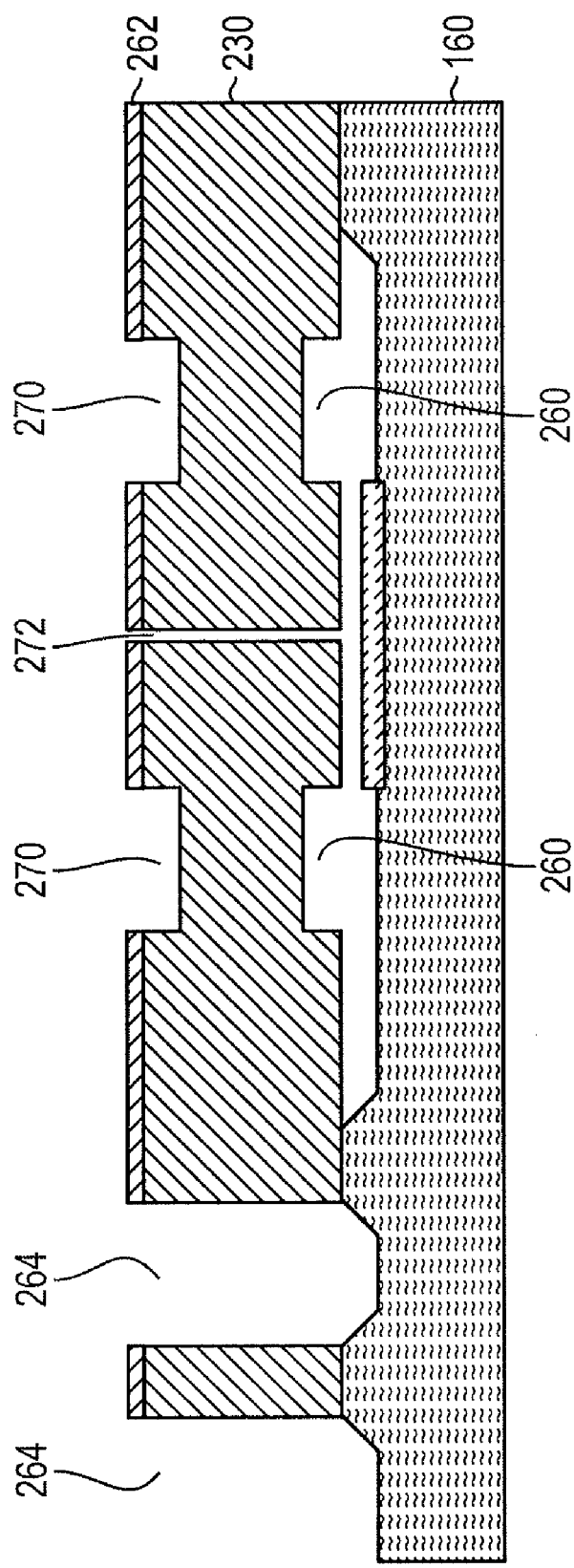

Referring to FIGS. 2D and 2E, second mask 266 may be removed from the surface of device layer 230 and from first mask 262. In an embodiment, second mask 266 is removed by application of a suitable solvent or by ashing with an oxygen plasma. Removal of second mask 266 may expose regions 263 of device layer 230. A second release etch may then be performed. Second release etch preferably removes a thickness of material approximately equal to $t_2$ from regions 263, release regions 264, and apertures 272, thus removing all remaining material from release regions 264 (and apertures 272) and forming second recesses 270 in regions 263. In an embodiment, the depth of second recesses 270 is approximately equal to the depth of first recesses 260, e.g., approximately 10 μm.

Figure 2F:
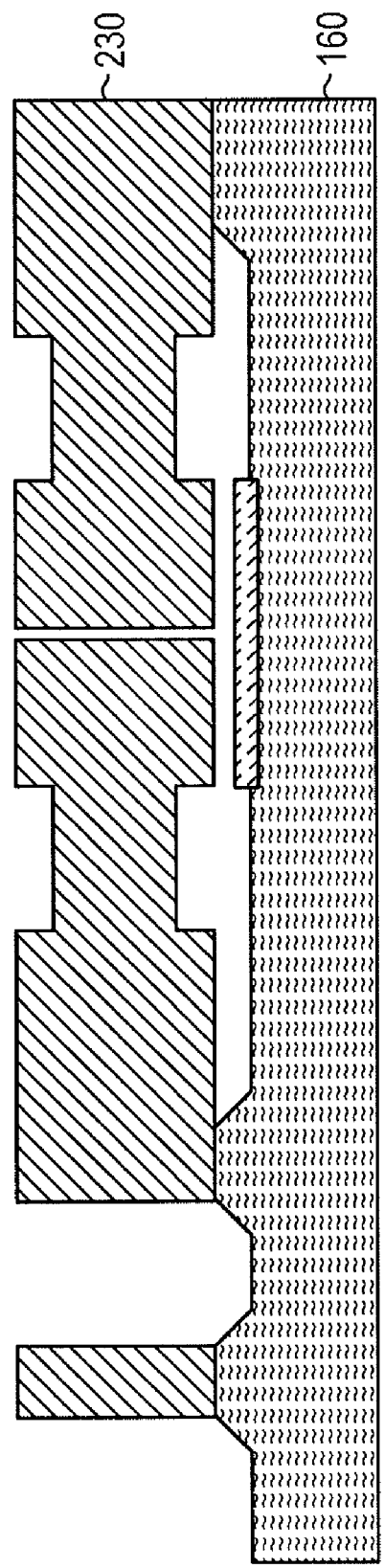
Figure 2G:
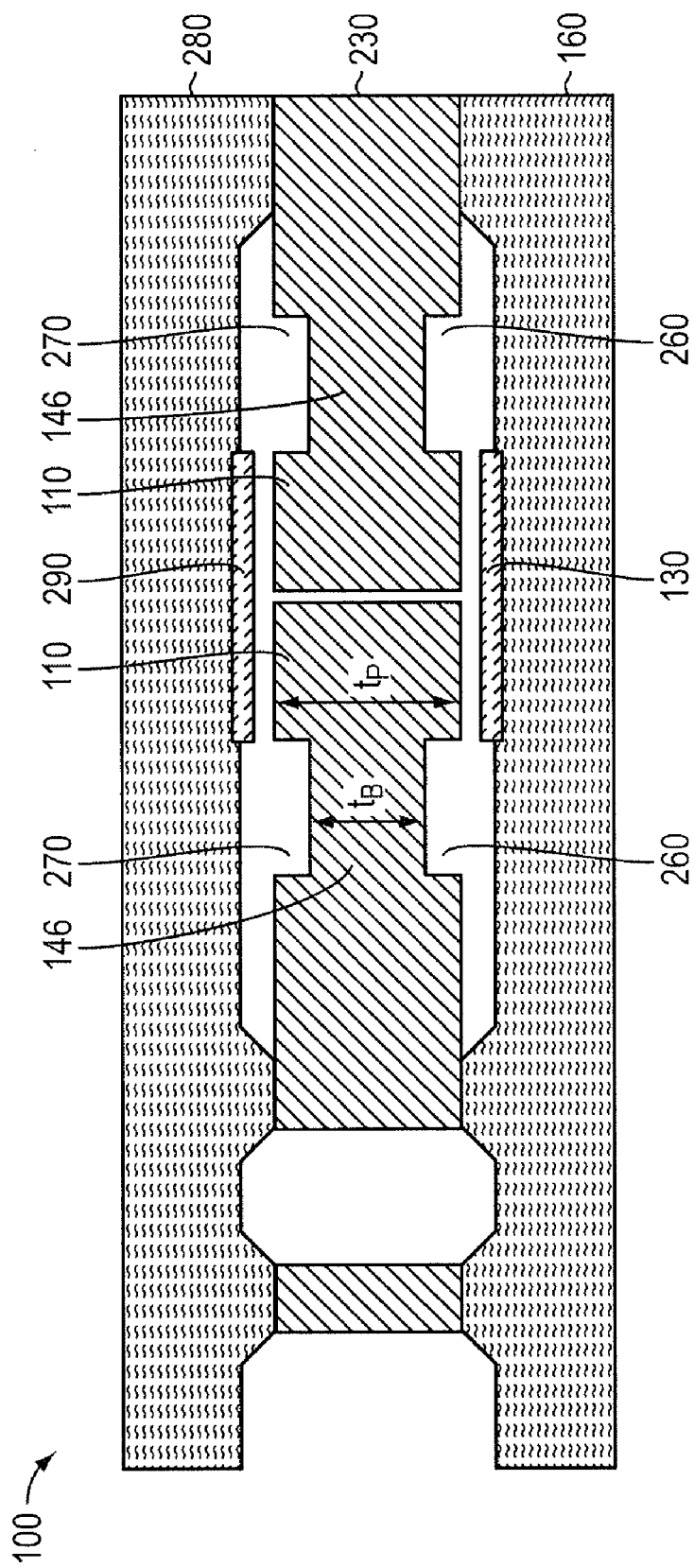

Referring to FIGS. 2F and 2G, first mask 262 is removed from the surface of device layer 230, e.g., by wet etching in a mixture of phosphoric acid, nitric acid, and acetic acid. An optional top substrate 280 may be attached to device layer 230 by, e.g., anodic bonding. Top substrate 280 may include or consist essentially of glass, e.g., borosilicate glass such as PYREX (e.g., Corning 7740), available from Corning Inc. of Corning, N.Y., or BOROFLOAT, available from Schott North America, Inc. of Elmsford, N.Y. Top substrate 280 may include upper sense plate 290 disposed approximately directly over lower sense plate 130. Upper sense plate 290 may include or consist essentially of any of the materials previously described in reference to lower sense plate 130. With additional reference to FIG. 1, sensor 100 may include suspension beams 146 having a thickness $t_B$ less than a thickness $t_P$ of proof mass 110. In an embodiment, each suspension beam 146 is approximately vertically centered with respect to proof mass 110, i.e., the depths of first recesses 260 and second recesses 270 are approximately equal.

Figure 3A:
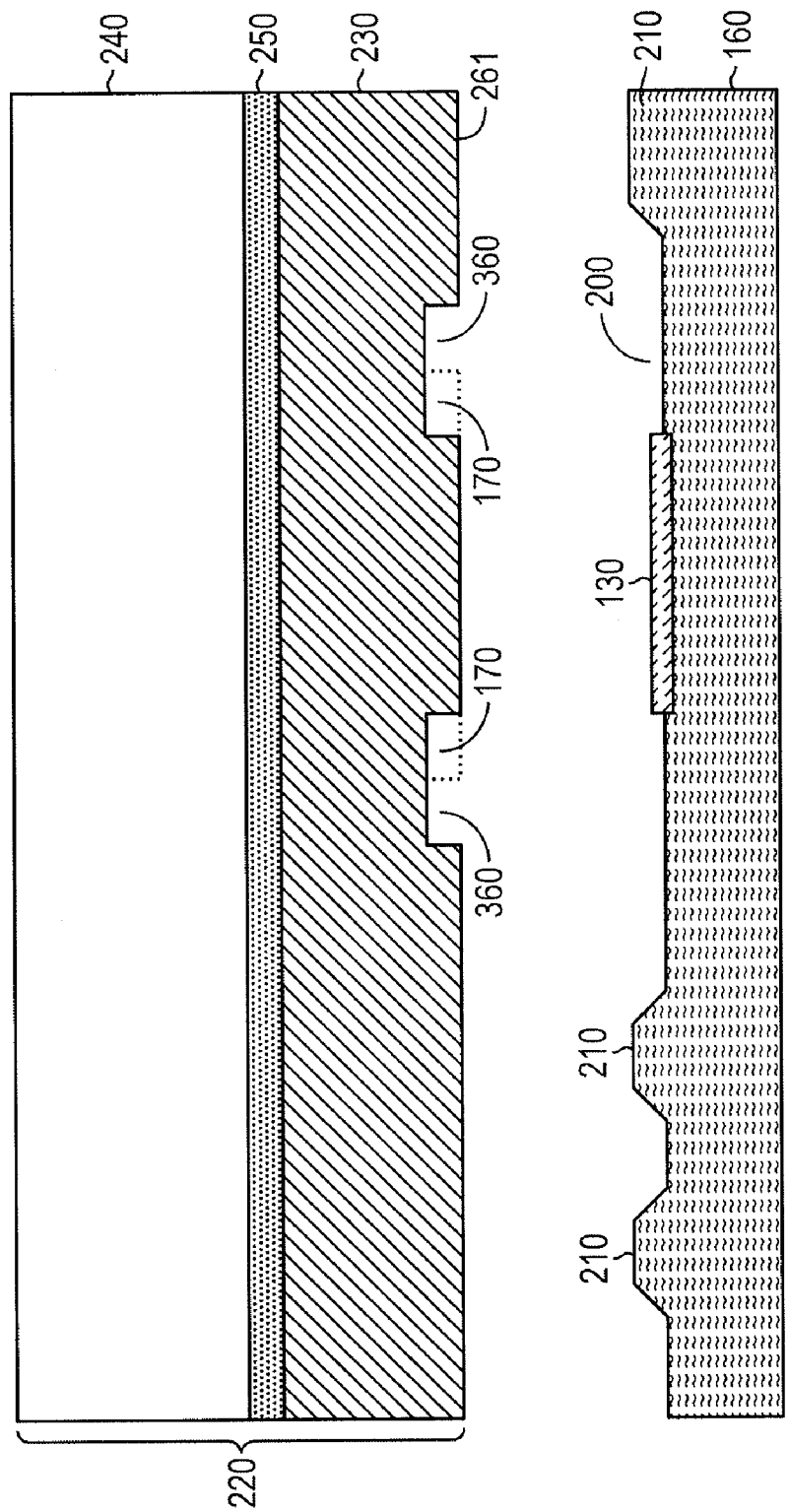
FIGS. 3A-3G are cross-sectional views of a process sequence for fabricating the sensor of FIG. 1 in accordance with another embodiment of the invention.

FIGS. 3A-3G are a series of cross-sectional views depicting an exemplary process for forming a sensor 100 that includes stationary comb fingers 180 having a thickness less than that of mobile comb fingers 170. Referring to FIG. 3A, recess 200 and mesas 210 may be formed on a surface of substrate 160, preferably as described above in reference to FIGS. 2A-2G. Bottom sense plate 130 may be formed within recess 200 by deposition of a conductive material, e.g., a metal, and etching, or by a lift-off process. Mesas 210 may act as anchoring bases for various portions of sensor 100 formed directly thereon such as anchors 140 and motors 120.

Second substrate 220, from which proof masses 110, motors 120, anchors 140, torsion beams 142, base beams 144, and suspension beams 146 may be formed, is provided. Second substrate 220 may include device layer 230 disposed over handle wafer 240, and may include insulator layer 250. Third recesses 360, one for each stationary comb finger 180 to be fabricated, may be formed in the exposed top surface 261 of device layer 230 (i.e., a first surface of second substrate 220). In an embodiment, the depth of third recesses 360 is approximately 10 μm. Areas of device layer 230 which will eventually become mobile comb fingers 170 are merely outlined in a dashed line in FIGS. 3A-3G for clarity. In an embodiment, mobile comb fingers 170 are not thinned, and therefore have a thickness approximately equal to that of device layer 230 (and proof mass 110).

Figure 3B:
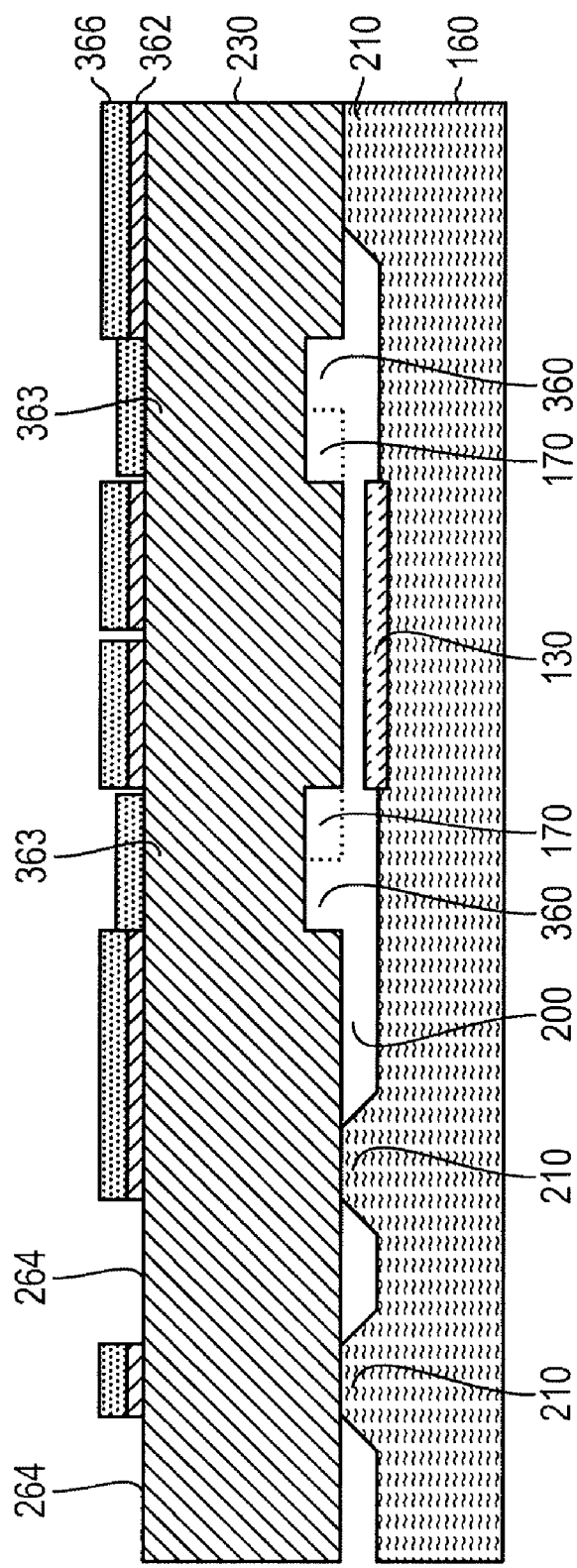

Referring to FIG. 3B, substrate 160 and second substrate 220 may be bonded together, i.e., mesas 210 on substrate 160 may be joined to the top surface of device layer 230 by, e.g., anodic bonding. After bonding, handle wafer 240 and insulator layer 250 may be removed by, e.g., two successive selective etches, as described above. After removal of handle wafer 240 and insulator layer 250, features such as proof masses 110, motors 120, mobile comb fingers 170, and stationary comb fingers 180 may be fabricated from device layer 230. A third mask 362 may be formed over areas of device layer 230 where thinning and/or material removal is not desired, e.g., areas defining proof masses 110. Third mask 362 may include or consist essentially of a conductive material, e.g., a metal such as aluminum, or a dielectric material such as silicon dioxide. In an embodiment, third mask 362 is not formed over regions 363 of device layer 230 disposed over third recesses 360, nor over release regions 264 disposed between mesas 210 which are meant to be entirely etched away, thus releasing suspended portions of sensor 100 such as proof masses 110. Fourth mask 366 may be formed over third mask 362, as well as over regions 363. In an embodiment, fourth mask 366 includes or consists essentially of photoresist.

Figure 3C:
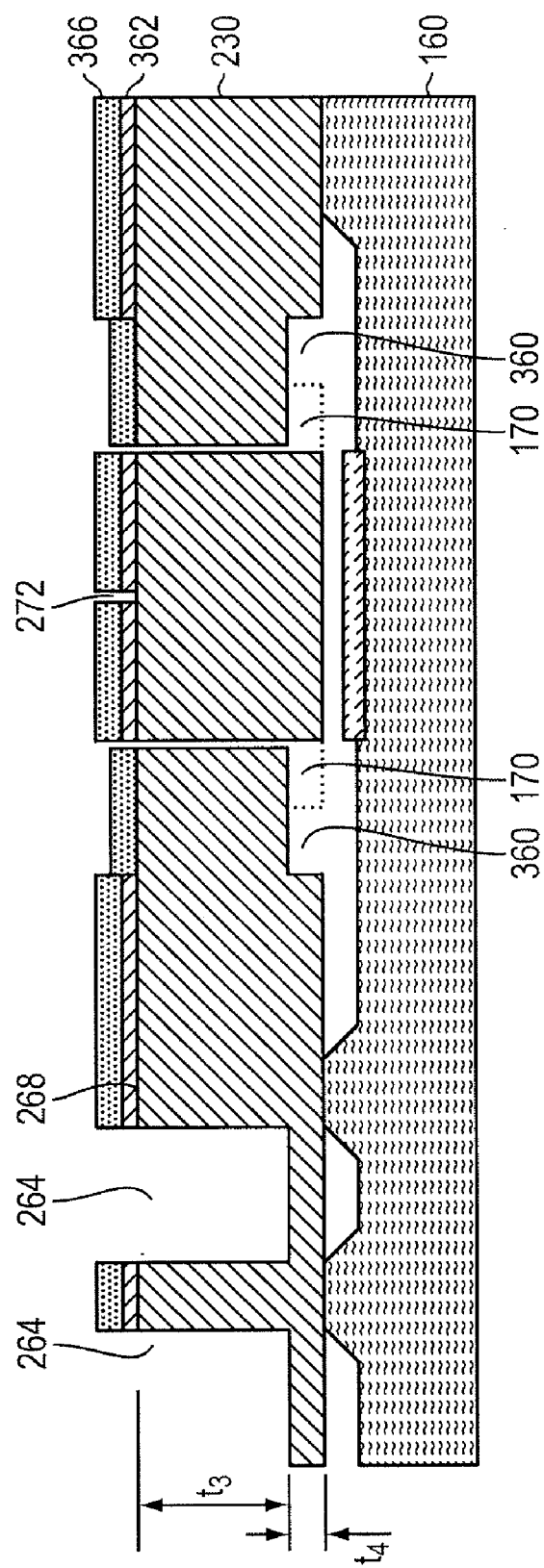

Referring to FIG. 3C, a first release etch, which removes material from release regions 264 (and not from regions protected by second mask 366), is performed on a second surface 268 of device layer 230 in a fashion similar to that described above in reference to FIG. 2C. First release etch may remove a thickness $t_3$ of device layer 230 in release regions 264, which preferably leaves a thickness $t_4$ of device layer 230 in release regions 264. Thickness $t_4$ is preferably greater than zero, and may be approximately equal to a depth of third recesses 360. Thus, thickness $t_4$ may be the approximate difference between the thickness of device layer 230 (which, in an embodiment, defines the thickness of proof masses 110) and the thickness of third recesses 360. In an embodiment, thickness $t_3$ is between approximately 40 μm and approximately 50 μm, e.g., approximately 44 μm. As described further below, thickness $t_4$ may define the depth of fourth recesses 370 (see FIG. 3E) formed on a top surface of stationary comb fingers 180. In an embodiment, the third release etch may also remove a thickness $t_3$ of material to define one or more apertures 272 (not shown in FIG. 1 for clarity) in regions of device layer 230 where proof masses 110 are to be fabricated.

Figure 3D:
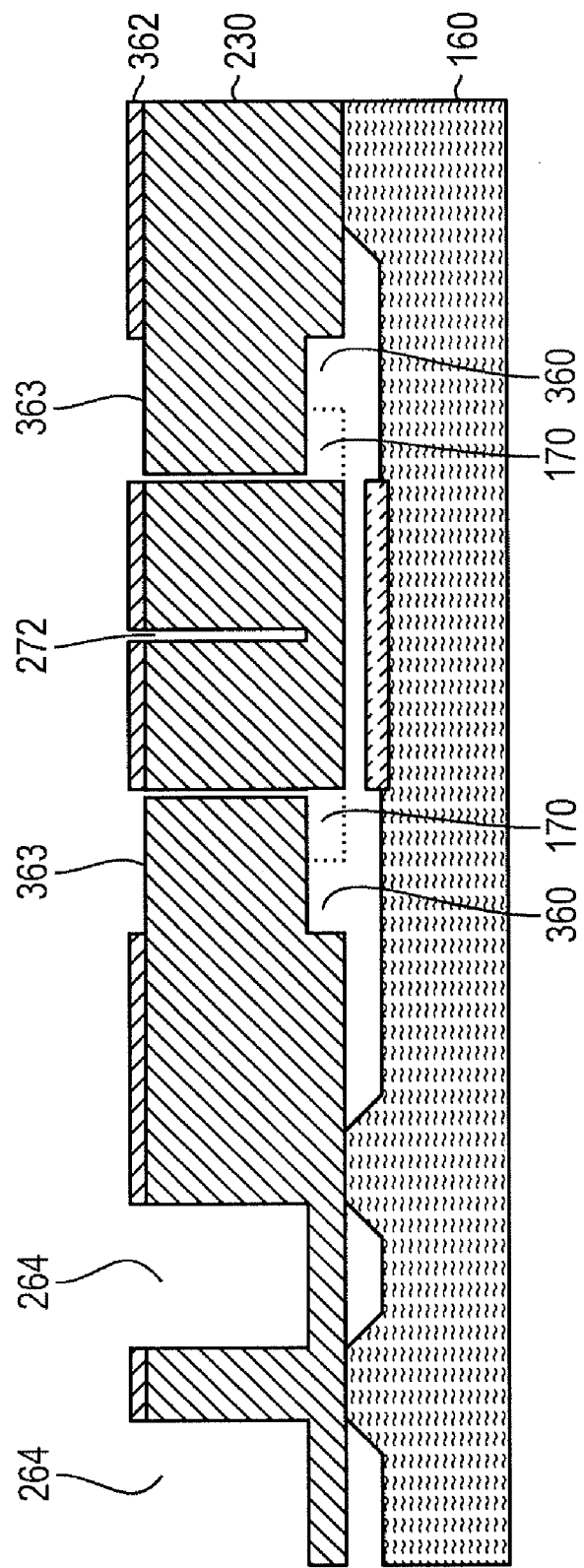
Figure 3E:
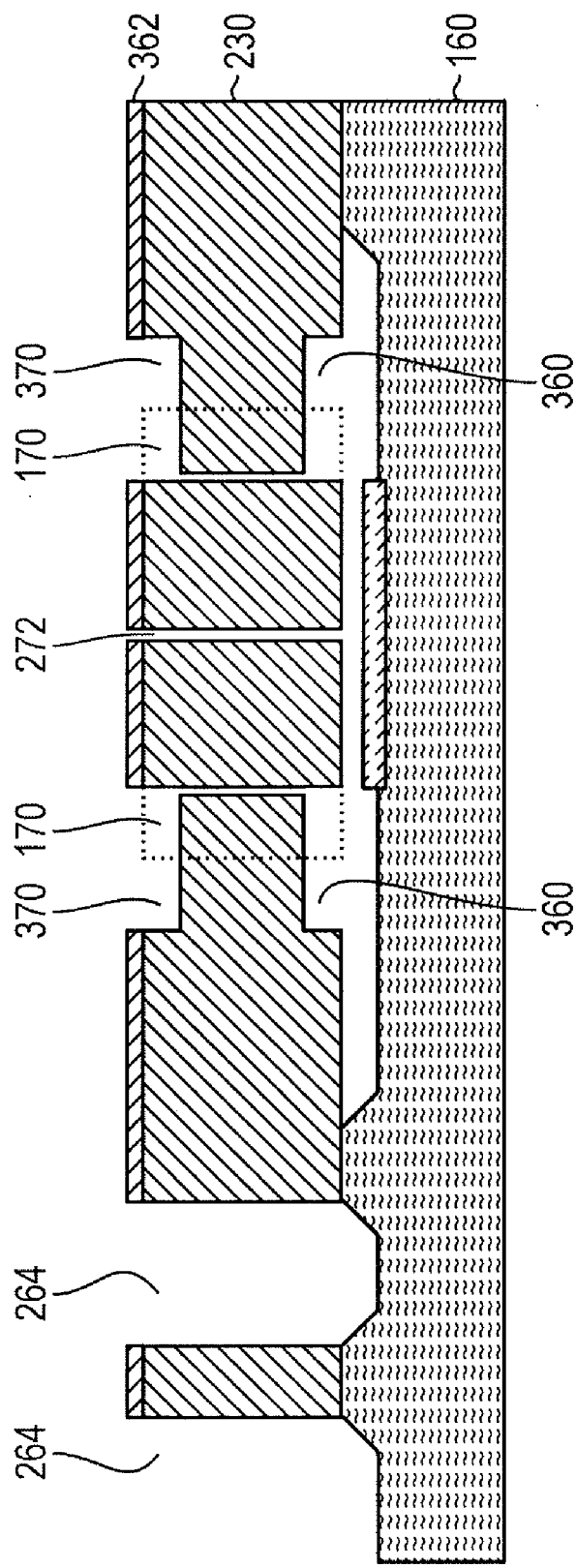

Referring to FIGS. 3D and 3E, fourth mask 366 may be removed from the surface of device layer 230 and from third mask 362. In an embodiment, fourth mask 366 is removed by application of a suitable solvent or by ashing with an oxygen plasma. Removal of fourth mask 366 may expose regions 363 of device layer 230. A second release etch may then be performed, as described above with reference to FIGS. 2D and 2E. Second release etch preferably removes a thickness of material approximately equal to $t_4$ from regions 363, release regions 264, and apertures 272, thus removing all remaining material from release regions 264 (and apertures 272) and forming fourth recesses 370 in regions 363. In an embodiment, the depth of fourth recesses 370 is approximately equal to the depth of third recesses 360, e.g., approximately 10 μm.

Figure 3F:
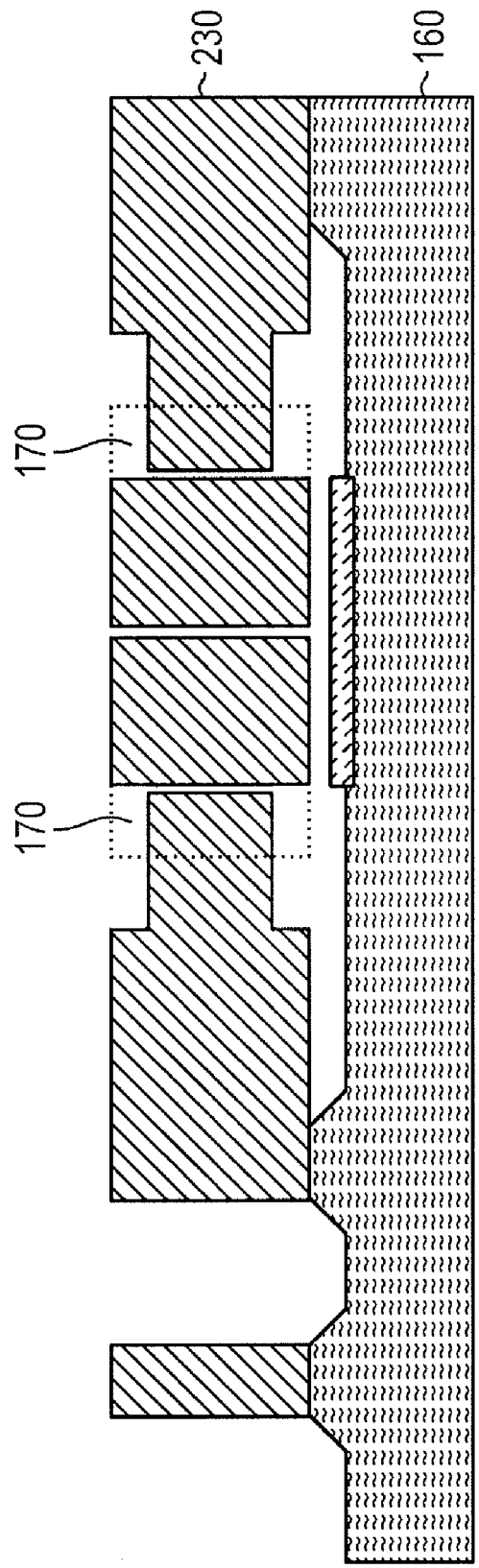
Figure 3G:
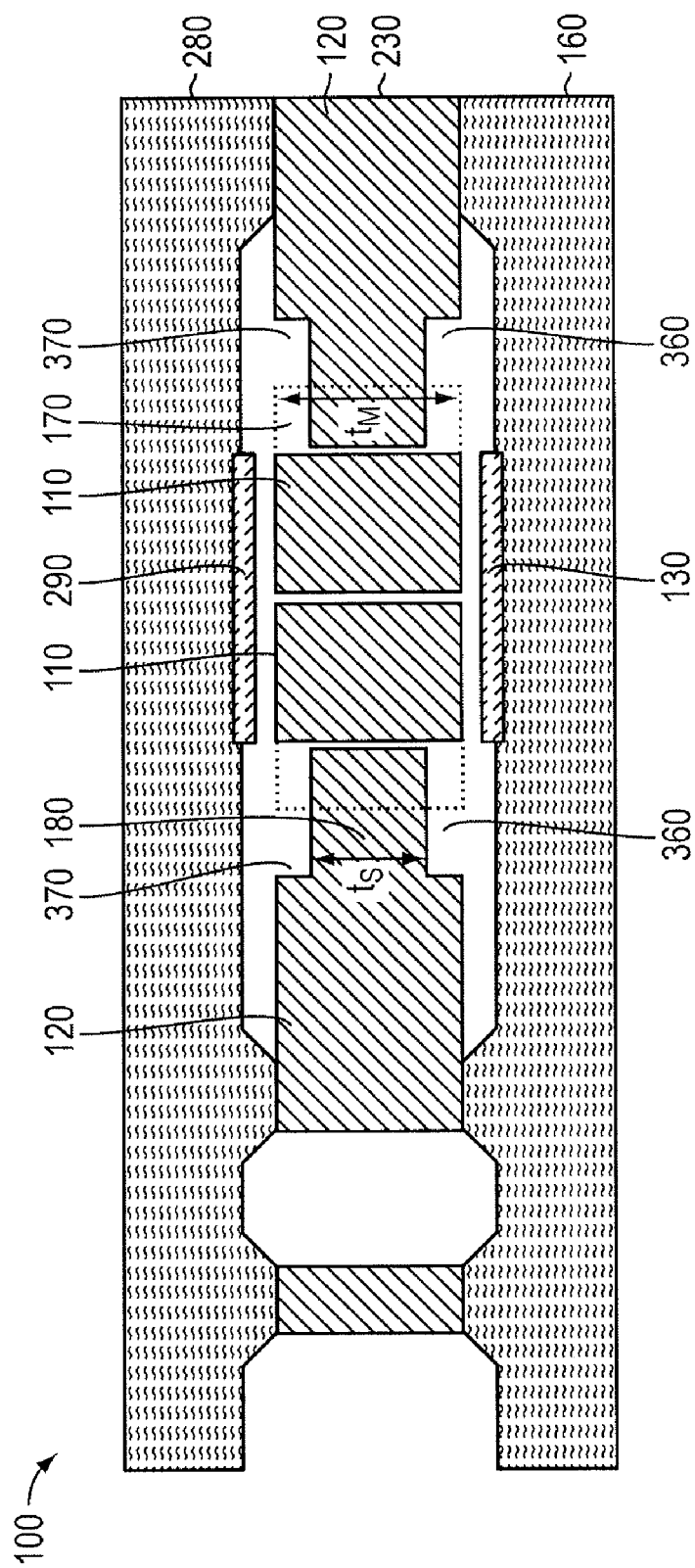

Referring to FIGS. 3F and 3G, third mask 362 is removed from the surface of device layer 230, e.g., as described above in reference to first mask 262 of FIGS. 2F and 2G. An optional top substrate 280 may be attached to device layer 230 by, e.g., anodic bonding. Top substrate 280 may include upper sense plate 290 disposed approximately directly over lower sense plate 130. With additional reference to FIG. 1, sensor 100 may include stationary comb fingers 180 having a thickness $t_S$ less than a thickness $t_M$ of mobile comb fingers 170. In an embodiment, each stationary comb finger 180 is approximately vertically centered with respect to proof mass 110 (and/or mobile comb fingers 170), i.e., the depths of first recesses 360 and second recesses 370 are approximately equal.

Herein, the processes depicted in FIGS. 2A-2G and FIGS. 3A-3G are presented as separate or alternative steps in separate exemplary sequences for the fabrication of sensor 100. However, in an embodiment, both sequences are combined into a single process sequence for sensor 100 having thinned suspension beams 146 and stationary comb fingers 180. Such a combined process sequence may be more efficient and less costly than embodiments in which suspension beams 146 and stationary comb fingers 180 are formed in substantially different sequences. In this embodiment, the step depicted in FIG. 2A may be combined with the step depicted in FIG. 3A, FIG. 2B with FIG. 3B, etc. Additionally, first mask 262 and third mask 362 may be the same, as may second mask 266 and fourth mask 366. Further, the depth of first recesses 260 may be substantially equal to the depth of third recesses 360 (and first recesses 260 and third recesses 360 may be formed substantially simultaneously), and the depth of second recesses 270 may be substantially equal to the depth of fourth recesses 370 (and second recesses 270 and fourth recesses 370 may be formed substantially simultaneously). Hence, the final thickness $t_B$ of suspension beams 146 may be substantially equal to the final thickness $t_S$ of stationary comb fingers 180.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method of fabricating a sensor, the method comprising:
    forming a first recess in a first surface of a first substrate;
    bonding a portion of the first surface of the first substrate to a second substrate;
    forming a second recess in a second surface of the first substrate, the first substrate consisting essentially of a single material between the first and second surfaces, and the second recess being disposed over the first recess, thereby forming a suspension beam located between the first and second recesses, the suspension beam suspending a proof mass over the second substrate;
    forming a third recess in the first surface of the first substrate; and
    forming a fourth recess in the second surface of the first substrate, thereby forming a stationary comb finger located between the third and fourth recesses and disposed over the second substrate.

2. The method of claim 1, wherein a thickness of the suspension beam is less than a thickness of the proof mass.

3. The method of claim 2, wherein a difference between the thickness of the proof mass and the thickness of the suspension beam is approximately equal to an aggregate depth of the first and second recesses.

4. The method of claim 1, wherein a depth of the first recess is approximately equal to a depth of the second recess.

5. The method of claim 1, wherein a thickness of the stationary comb finger is less than a thickness of a mobile comb finger disposed on an edge of the proof mass.

6. The method of claim 1, wherein a depth of the third recess is approximately equal to a depth of the fourth recess.

7. The method of claim 1, wherein the first and third recesses are formed substantially simultaneously and the second and fourth recesses are formed substantially simultaneously.

* * * * *